Sept. 1, 1959 H. I. STANBACK ET AL 2,902,632
ELECTRICAL PANELBOARD
Filed Jan. 20, 1955 3 Sheets-Sheet 2
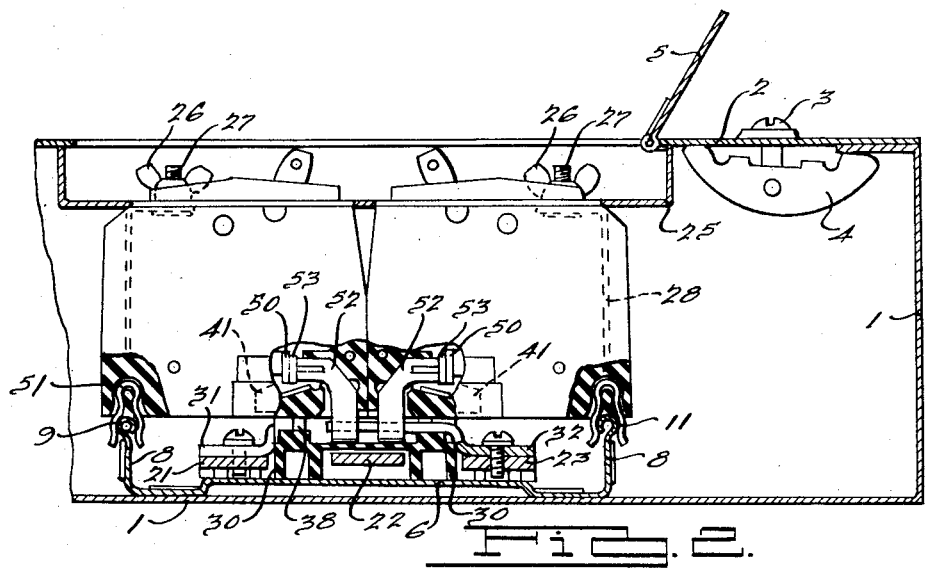
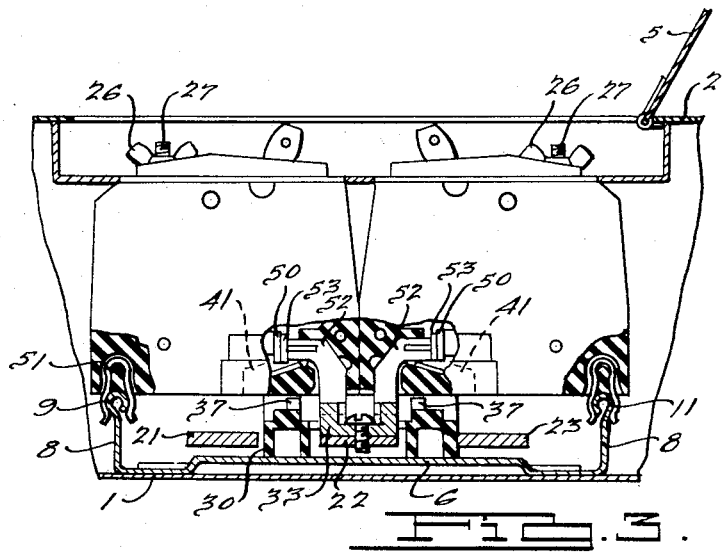
INVENTORS
Harris I. Stanback
Ralph H. Kingdon
BY
Myron J. Seibold
ATTORNEY

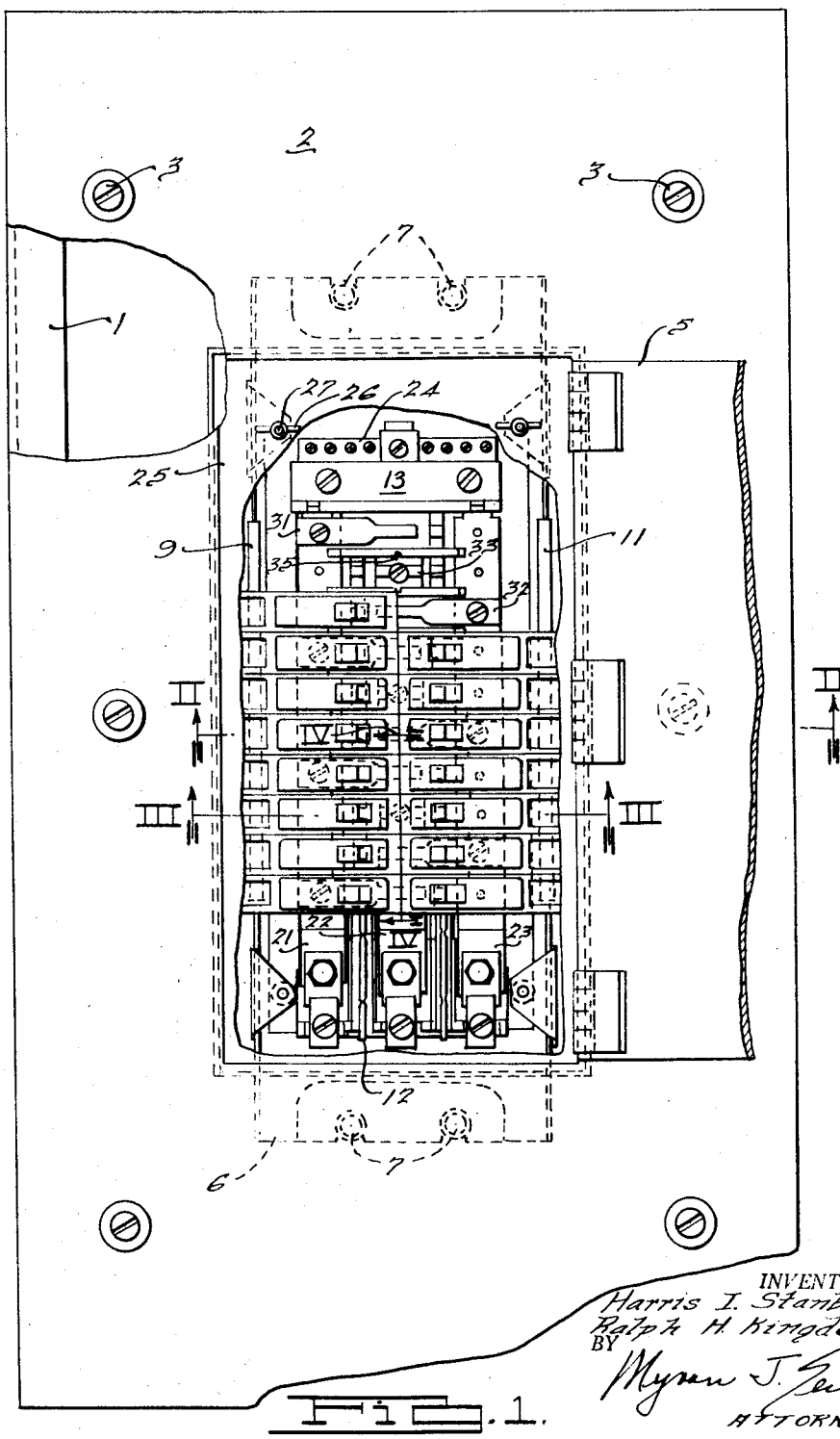

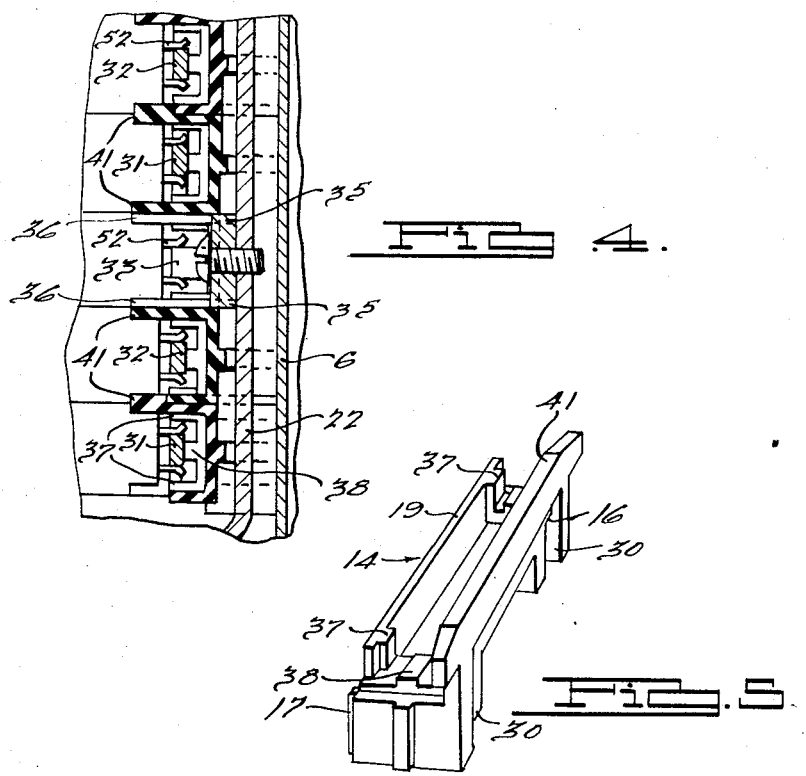
Fig. 4.
Fig. 5.
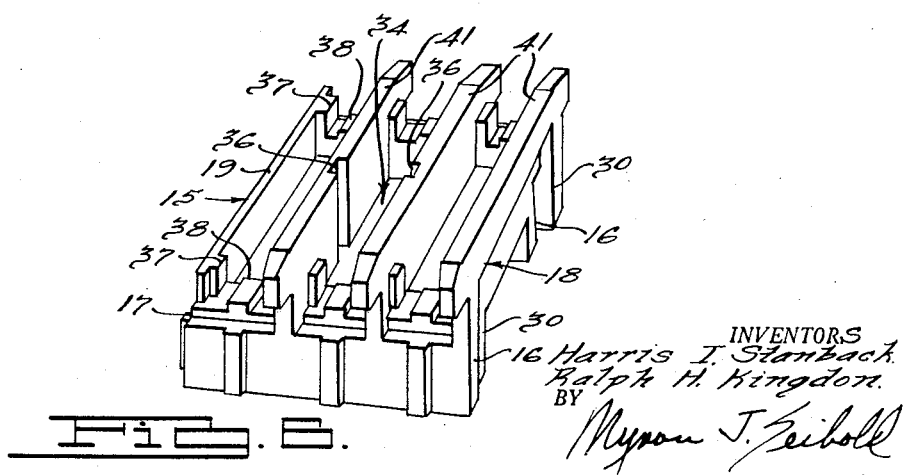
Fig. 6.
INVENTORS
Harris I. Stanback.
Ralph H. Kingdon.
BY Myron J. Seibold
ATTORNEY.

United States Patent Office 2,902,632
Patented Sept. 1, 1959

2,902,632

ELECTRICAL PANELBOARD

Harris I. Stanback and Ralph H. Kingdon, Birmingham, Mich., assignors to Square D Company, Detroit, Mich., a corporation of Michigan Application January 20, 1955, Serial No. 483,048

4 Claims. (Cl. 317—119)

This invention relates to an electrical panelboard and has for its object the provision of a panelboard in which the individual circuit controlling units are mounted directly to the conducting parts within the panelboard at one end by a spring jaw device, and, at the other end, by a second spring jaw device to a non-conducting mounting bar whereby the individual circuit controlling units may be readily attached and removed without the manipulation of attaching screws.

A further object of the invention is to provide an electrical panelboard having a central bus attachment area presenting a plurality of isolated phases of energization and in which the individual circuit controlling units constituting the panelboard are provided with selectable access to any one of the plurality of phases of energization from either side of the panelboard.

A further object of the invention is to provide an electrical panelboard having main excitation busses and a plurality of central bus attachment areas in superposed relation presenting separate attachment busses; each of the adjacent attachment busses being insulated from each other, excited by different main busses and accessible for individual circuit controlling units from both sides of the panelboard.

A further object of the invention is to provide an electrical panelboard having a plurality of individual circuit controlling units, a plurality of individual excitation busses and a central bus attachment area comprising terminal busses attached at one end thereof to the excitation busses and extending into the central area for availability to the individual units.

Further objects and features of the invention will be readily apparent to those skilled in the art from the specification and appended drawings illustrating certain preferred embodiments in which:

Figure 1 is a front elevational view of the panelboard of the present invention with portions of the box and cover broken away to show internal parts.

Figure 2 is a sectional view along the lines II—II of Figure 1.

Figure 3 is a sectional view along the lines III—III of Figure 1.

Figure 4 is a sectional view along the lines IV—IV of Figure 1.

Figure 5 is a perspective view of an insulating base section of single unit construction.

Figure 6 is a perspective view of an insulating base section of three unit construction.

The panelboard, according to the present invention, comprises a sheet metal box 1 having a cover 2 normally secured to the box 1 by screws 3 engaging trim clamps 4 and provided with a hinged central cover 5 permitting access to the interior of the panelboard.

Within the box 1 there is supported an interior comprising a sheet metal base member 6 secured to the base of the box 1 at studs 7 and having the sides thereof upwardly turned at 8 and return looped upon themselves to present continuous rolled over mounting beads or bars at 9 and 11 which extend substantially the entire length of the interior. The insulating portions of the interior include a pair of end insulators one of which at 12 provides for terminal connections and the other at 13 constitutes an end barrier and, therebetween, a suitable plurality of insulating base members, more specifically shown in Figures 5 and 6, of either the single unit variety 14 or the three unit variety 15. The number and combination of these two varieties of insulating base sections 14 and 15 being dictated by the number of circuit controlling units for which space is to be provided in the panel, as for instance, in the case of a twenty unit panel, as is shown in Figure 1, the insulating base section of the interior will constitute three three unit insulators 15 and one single unit insulator 14. The insulating base sections are provided with a slot along their lower legs at 16 and a complementary projection 17 at the opposite end of the insulating base section with the slots and projections in adjacent insulating base sections being interengageable to provide for alignment of adjacent units. One end of the insulating base sections is provided with a cutout or recess at 18 to allow accommodation space for a complementary portion 19 at the opposite end of the adjacent insulating base section so that adjacent sections fit snugly to present a continuous row of insulated units. In assembling the insulating base sections within the interior, the terminal end insulator 12 is fixed in place and the required number of insulating base sections are assembled and joined together for placement in the interior and then the end barrier 13 is positioned and secured by suitable screws as shown in Figure 1 to hold the insulating base sections tight against the terminal barrier 12, the entire assembly being suitably insulated from the metallic portions of the interior base 6.

Three busses are provided extending the length of the interior at 21, 22 and 23 and are mounted with main lugs on the terminal insulator 12 by suitable studs as shown and at the opposite end positioned in slots in the end barrier 13 near the base portion thereof. A neutral bar 24 is supported on the end barrier 13 by suitable means, not herein shown, and provided with a plurality of neutral connecting terminals. As is shown in Figures 2 and 3, the adjacent busses 21, 22 and 23 are separated by support portions 30 of the insulating base sections 14 or 15.

The interior of the panelboard is designed to provide a central area within the insulating base sections to which individual circuit controlling units comprising the panelboard may be attached for energization. To establish this central excitation area, terminal attachment busses are secured to each of the three main excitation busses to bring to the center of the insulating base sections the electrical energy provided in the excitation busses. The terminal attachment busses for the two outside excitation busses 21 and 23 are constituted by offset conducting straps 31 and 32 respectively, as shown in Figure 2, and the terminal attachment bus for the central bus 22 is constituted by a solid or formed conductor 33 extending through a central hole 34 in the three unit insulating base section 15.

The terminal attachment busses 31, 32 and 33 are individually attached to their respective excitation busses 21, 23 and 22 respectively, by suitable screws as shown in Figures 2 and 3 and the terminal attachment bus 33 for the central bus 22 is provided with side ribs 35 cooperating with grooves 36 in the three unit base insulating section 15 to ensure proper alignment therewithin. The offset busses 31 and 32 are maintained in proper alignment through cooperation with portions of their associated units of the insulating base sections as shown in Figures 5 and 6 constituting side projections 37 and bottom projection 38. As shown in Figure 1, the interior ends of the terminal attachment busses 31 and 32 are reduced in width and extend beyond the center of the insulating base sections to provide terminal areas accessible to circuit controlling units supported at both sides of the panel as may be seen by reference to Figures 2 and 3 and as will be more fully explained hereinafter. The terminal bus 33 has a similar width at both sides of the central panelboard axis to also provide for end to end unit mounting.

The insulating base sections 14 and 15 are provided with upwardly extending insulation barriers 41 separating the terminal busses 31, 32 and 33 and defining the access areas for the pairs of end to end mounted circuit controlling units comprising the panel.

Referring now to Figures 2 and 3 showing the circuit controlling units constituting the panelboard of the present invention in their mounted position in the panelboard, the individual circuit controlling units have spring clips and terminals for mechanically and electrically connecting the units into the panelboard, each unit having a pair of spring clip devices, one insulated from the mechanism of the circuit controlling unit and the other of the spring clip devices constituting a current carrying terminal. The spring clip device which is insulated from the circuit controlling unit is constituted by a resilient, non-current carrying spring clip 51 supported on insulation portions of the circuit controlling unit and secured between the cover and base of the unit during assembly thereof. The other spring clip device 52 is constituted by a current carrying portion of the circuit controlling unit cooperating with the interior mechanism of the unit and may be, as is shown in Figures 2 and 3, a conducting jaw carrying at its inner portions a stationary contact 53 with which cooperates the movable contact 50 of the circuit controlling unit. Spring clip 52 cooperates with portions of the insulating base of the circuit controlling unit and is supported in the unit and maintained in place by the insulating cover and base of the unit when the unit is assembled. It should be noted that the axes of the spring clip devices 51 and 52 are rotated 90 degrees with respect to each other so as to facilitate the location and mounting of the electrical and mechanical supporting parts for the circuit controlling units in the panelboard. As is shown in Figures 2 and 3, the non-conductive spring jaws 51 mechanically engages and clamps over the rolled over mounting beads or bars 9 and 11 provided on legs 8 of the interior pan 6 and the current carrying spring clips 52 from contact jaws engaging their associated terminal attachment busses 31, 32 or 33.

Also shown in Figures 2 and 3 is the arrangement whereby the circuit controlling units mounted to either the right or the left hand side of the panelboard have access to the terminal busses attached to either of the outside excitation busses or to the central excitation bus as provided by the extension of the terminal busses beyond the center axis of the insulating base sections; as, for instance, in Figure 2, both the right and left hand circuit controlling units are mounted so that their spring clip jaws engage the reduced width portion of the transfer bus 32 and are therefore both energized by the excitation bus 23. Figure 3 illustrates the connection of right and left hand circuit controlling units to the central transfer bus 33 attached to the central excitation bus 22.

The interior section of the panel is completed by an interior trim pan 25 secured by nuts 26 to studs 27 fixed on brackets 28 suitably secured at their lower ends to the sheet metal base section 6, the interior pan 25 being provided with a plurality of central cutout portions through which extend the operating handles or the like of the individual circuit controlling units to be mounted in the panelboard and to which access may be had from the front of the panelboard with the hinged door 5 opened; the pan 25 otherwise preventing access to the electrical wiring for the devices mounted within the panelboard.

With the cover 2 and trim pan 25 removed, individual circuit controlling units are easily mounted within the panelboard without any mechanical or electrical attachment other than that provided by the engagement of the spring clips 51 and 52. This engagement may be effected by simply pressing the unit inwardly with the spring jaw 52 embracing one of the terminal attachment busses 31, 32, 33 and with the spring clip 51 embracing one of the attachment beads or bars, 9 or 11. The terminal jaw 52 will constitute the line terminal connection for the circuit controlling unit and the load terminal connection, not shown, may be made either before or after the unit is mounted in the panelboard, this being effected in conventional manner by normal circuit wiring. The jaw 52 and terminal attachment bus engagement as well as the barriers 41 will locate the units longitudinally of the panelboard and the spring clip 51 and attachment bead 9, 11 engagement will locate the units transversely of the panelboard. Removal of a circuit controlling unit is effected just as easily as its attachment by simply pulling the unit to release its resilient spring clip and jaw connections.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed:

1. In an electrical panelboard, an enclosure, electrical conducting parts within said enclosure, a plurality of circuit controlling devices mounted in said enclosure substantially in front of said conducting parts, each of said devices having a pair of spring clips thereon opening toward the back thereof, a non-current carrying member of generally circular cross-section supported by said enclosure and extending parallel to said electrical conducting parts, a plurality of spaced members of current carrying material supported within said enclosure and attached to said electrical conducting parts, said clips on said circuit controlling devices supporting said device within said enclosure with one of said clips engaging said non-current carrying member and the other of said clips engaging one of said current carrying members, said clip engaging said non-current carrying member having its axis disposed parallel to the transverse axis of said device, and said clip engaging said current carrying member having its axis disposed parallel to the longitudinal axis of said device.

2. In an electrical panelboard, an enclosure, a base pan secured to said enclosure and having an upturned flange, electrical conducting parts within said enclosure, a plurality of circuit controlling devices mounted within said enclosure substantially in front of said conducting parts, non-current carrying mounting means secured within said enclosure spaced from said conducting parts, said mounting means comprising a continuous rolled-over edge on said flange, each of said circuit controlling devices having a pair of spring clips thereon opening toward the back thereof, one of each pair of clips receiving said mounting means in resilient mechanical only engagement and having an axis parallel to the transverse axis of said device, the other of each pair of clips engaging said conducting parts in both mechanical and electrical engagement and having an axis parallel to the longitudinal axis of said device.

3. In an electrical panelboard, an enclosure, electrical conducting parts within said enclosure, an assembly of circuit controlling devices mounted in said enclosure substantially in front of said conducting parts, each of said devices having a pair of spring jaw clips thereon opening toward the back thereof, one of said clips being electrically connected to the device to form a terminal thereof and the other clip being mounted on the device in insulated relation, said insulated clip being rotated 90° with respect to said terminal clip whereby said insulated clip and said terminal clip can engage portions within said enclosure having axes normal to each other to rigidly support said device.

4. In an electrical panelboard, an enclosure, electrical conducting parts within said enclosure, an assembly of circuit controlling devices mounted in said enclosure substantially in front of said conducting parts, each of said devices having a pair of spring jaw clips thereon opening toward the back thereof, one of said clips being electrically connected to the device to form a terminal thereof and the other clip being a mounting clip supported in said device in insulated relation, said terminal clip being adjacent to one end of the device and having its opening axis aligned with the length of said device, said mounting clip extending adjacent to the opposite end of said device and having its opening axis aligned transversely of said device, whereby said terminal clip and said mounting clip can resiliently support said device.

References Cited in the file of this patent

UNITED STATES PATENTS

| | | |
|---|---|---|
| 1,638,257 | Gunn | Aug. 9, 1927 |
| 1,930,028 | Adam | Oct. 10, 1933 |
| 2,169,708 | O'Callaghan | Aug. 15, 1939 |
| 2,351,942 | Dyer | June 20, 1944 |
| 2,440,824 | Jackson | May 4, 1948 |
| 2,733,386 | Myers | Jan. 31, 1956 |
| 2,737,613 | Morris | Mar. 6, 1956 |
| 2,739,272 | Norden | Mar. 20, 1956 |

FOREIGN PATENTS

| | | |
|---|---|---|
| 502,056 | Canada | May 4, 1954 |